US008412878B2

(12) United States Patent
Sutardja (10) Patent No.: US 8,412,878 B2
(45) Date of Patent: Apr. 2, 2013

(54) COMBINED MOBILE DEVICE AND SOLID STATE DISK WITH A SHARED MEMORY ARCHITECTURE

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 798 days.

(21) Appl. No.: 12/501,728

(22) Filed: Jul. 13, 2009

(65) Prior Publication Data
US 2010/0011159 A1    Jan. 14, 2010

Related U.S. Application Data

(60) Provisional application No. 61/080,510, filed on Jul. 14, 2008.

(51) Int. Cl.
*G06F 12/00* (2006.01)
*G06F 13/00* (2006.01)
(52) U.S. Cl. ......... 711/101; 711/154; 711/133; 711/159
(58) Field of Classification Search .................. 711/101, 711/154, 133, 159
See application file for complete search history.

(56) References Cited

U.S. PATENT DOCUMENTS

| | | |
|---|---|---|
| 2004/0243877 A1 | 12/2004 | Skamoto et al. |
| 2007/0106836 A1 | 5/2007 | Lee et al. |
| 2008/0140918 A1 | 6/2008 | Sutardja |

OTHER PUBLICATIONS

Notification of Transmittal of The International Search Report and The Written Opinion of The International Searching Authority, or The Declaration dated Oct. 6, 2009 in reference to PCT/US2009/050484 (12 pgs).
ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.
IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.
IEEE Std 802.11b-1999/Cor 1-2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications: Amendment 2: Higher-speed Physical Layer (PHY) extension in the 2.4 GHz band; Corrigendum 1; IEEE Computer Society; LAN/MAN Standards Committee; Nov. 7, 2001; 23 pages.

(Continued)

*Primary Examiner* — Midys Rojas (57) ABSTRACT

A mobile device including a system-on-chip, which includes a mobile device control module to execute application programs for the mobile device, a solid-state disk (SSD) control module to control SSD operations, a random access memory (RAM) control module to store both SSD-related data and mobile device-related data in a single RAM, and a nonvolatile (NV) memory control module to control reading from and writing to the NV memory array. Data in the single RAM is stored into the NV memory array during an idle mode. The single RAM is powered down during the idle mode after the data in the single RAM has been stored into the NV memory array. The stored data in the NV memory array is loaded into the single RAM during a re-start mode.

12 Claims, 5 Drawing Sheets

OTHER PUBLICATIONS

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor 1-2001, 802.11d™-2001, 802.11g™-2003]; IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 23 pages.

COMBINED MOBILE DEVICE AND SOLID STATE DISK WITH A SHARED MEMORY ARCHITECTURE

CROSS-REFERENCE TO RELATED APPLICATIONS

This application claims the benefit of U.S. Provisional Application No. 61/080,510, filed on Jul. 14, 2008. The disclosure of the above application is incorporated herein by reference in its entirety.

FIELD

The present disclosure relates to mobile devices, and more particularly to mobile devices that utilize solid state disks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A solid-state disk (SSD) is a data storage device that uses solid-state memory to store persistent data. Unlike flash-based memory cards, SSDs usually emulate hard disk drives (HDDs). SSDs using static random access memory (SRAM) or dynamic RAM (DRAM) instead of flash memory are often called RAM-drives, which require power to be applied to maintain the memory. NAND-based SSDs retain memory states when power is not applied.

The term "Solid State" in SSD refers to the use of semiconductor devices rather than electromechanical devices such as HDDs comprising motors and spinning disks. With no moving parts, SSDs are less fragile than HDDs and therefore also silent (unless a cooling fan is used). Since there are no mechanical delays, SSDs tend to have relatively low access times and latency. SSDs also tend to dissipate less power than HDDs. SSDs are being used more frequently in laptop computers. However, more significant use of the SSDs has been limited by their substantially higher storage cost per memory unit than the HDDs.

SUMMARY

A mobile device comprises a system-on-chip (SOC). The SOC comprises a mobile device control module, a solid state disk (SSD) control module, and a random access memory (RAM) control module. The mobile device control module executes application programs for the mobile device. The solid-state disk (SSD) control module controls SSD operations. The RAM control module communicates with the mobile device control module and the SSD control module and stores both SSD-related data and mobile device-related data in a single RAM.

The mobile device further comprises a processor that performs processing for both the mobile device control module and the SSD control module. The processor uses a data tag to tag data to be read from/written to the RAM. The data tag associates the data with one of the mobile device control module and the SSD control module. The RAM control module stores the data in one of an SSD portion of the RAM and a mobile device portion of the RAM based on the data tag.

The mobile device control module comprises a mobile device processor that performs processing for the mobile device control module. The SSD control module comprises an SSD processor that performs processing for the SSD control module. The mobile device further comprises a nonvolatile (NV) memory control module that communicates with the SSD control module and a NV memory array and that controls reading from and writing to the NV memory array.

A method comprises controlling a mobile device using a mobile device control module and controlling a solid-state disk (SSD) of the mobile device using a SSD control module. The method further comprises partitioning a random access memory (RAM) of the mobile device into first and second partitions. The method further comprises determining an origin of a request to read/write data from/to the RAM when the request is received from at least one of the mobile device control module and the SSD control module. The method further comprises reading/writing the data from/to one of the first and second partitions based on the origin. The method further comprises associating a data tag with said data and determining said origin based on said data tag.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

While solid-state disks (SSDs) are being used in increasing numbers in laptop computers, SSDs have generally not been used in other smaller or less expensive mobile devices. For example only, these mobile devices include cellular phones, personal digital assistants (PDAs), global positioning systems (GPS), portable gaming devices, music players such as MP3 players, and other similar mobile devices. These devices tend to have smaller form factors, lower capacity batteries, and lower retail cost.

The SSDs typically use a high-speed interface to communicate with a host device. The high-speed interface may include a serial or parallel advanced technology attachment (SATA and PATA, respectively) interface, a serializer/deserializer (SERDES), a Peripheral Component Interconnect (PCI) interface, a PCI Express (PCIe) interface, and/or other suitable interfaces. The high-speed interface dissipates relatively high power, which consumes battery power quickly. In addition, packaging of the SSDs tends to be too large to be easily integrated with the host mobile device without substantially increasing the overall size of the combined mobile device.

SSDs typically comprise a nonvolatile (NV) memory array and an NV memory control module that controls the NV memory array. The NV memory array may include flash memory (e.g., NAND flash). Most high-quality SSDs also use relatively large, high-speed volatile random access memory (RAM) for temporarily storing operational data and buffer data during read/write operations of the SSD. For example, the RAM may include dynamic RAM (DRAM). The RAM is typically implemented as a separate chip, which increases cost and size. The cost and size increases and power dissipation of the RAM have posed significant bottlenecks to the adoption of SSDs into mobile devices.

According to some implementations of the present disclosure, an SSD control module that controls the SSD and an application control module of the mobile device are integrated as a system-on-chip (SOC). As a result, a designated portion of the RAM that is already present for the application control module can also be used for temporary storage during operation of the SSD control module. Therefore, only a single RAM for both modules is used, which reduces size, power dissipation, and cost.

Integrating the SSD control module with the application control module also reduces power dissipation since the high-speed interface between the SSD control module and the application control module is no longer needed. The SSD and the mobile device according to the present disclosure have a shared memory architecture.

In some implementations, a portion of the high-speed RAM that is used for the SSD is protected from being accessed by the application control module to maintain integrity of the SSD. Also, when the SSD is idle, the SSD control module can be quickly powered up or down to prolong battery life of the mobile device. In addition, the NV memory control module and NV memory array of the SSD may also be powered down to prolong battery life of the mobile device.

Figure 1:
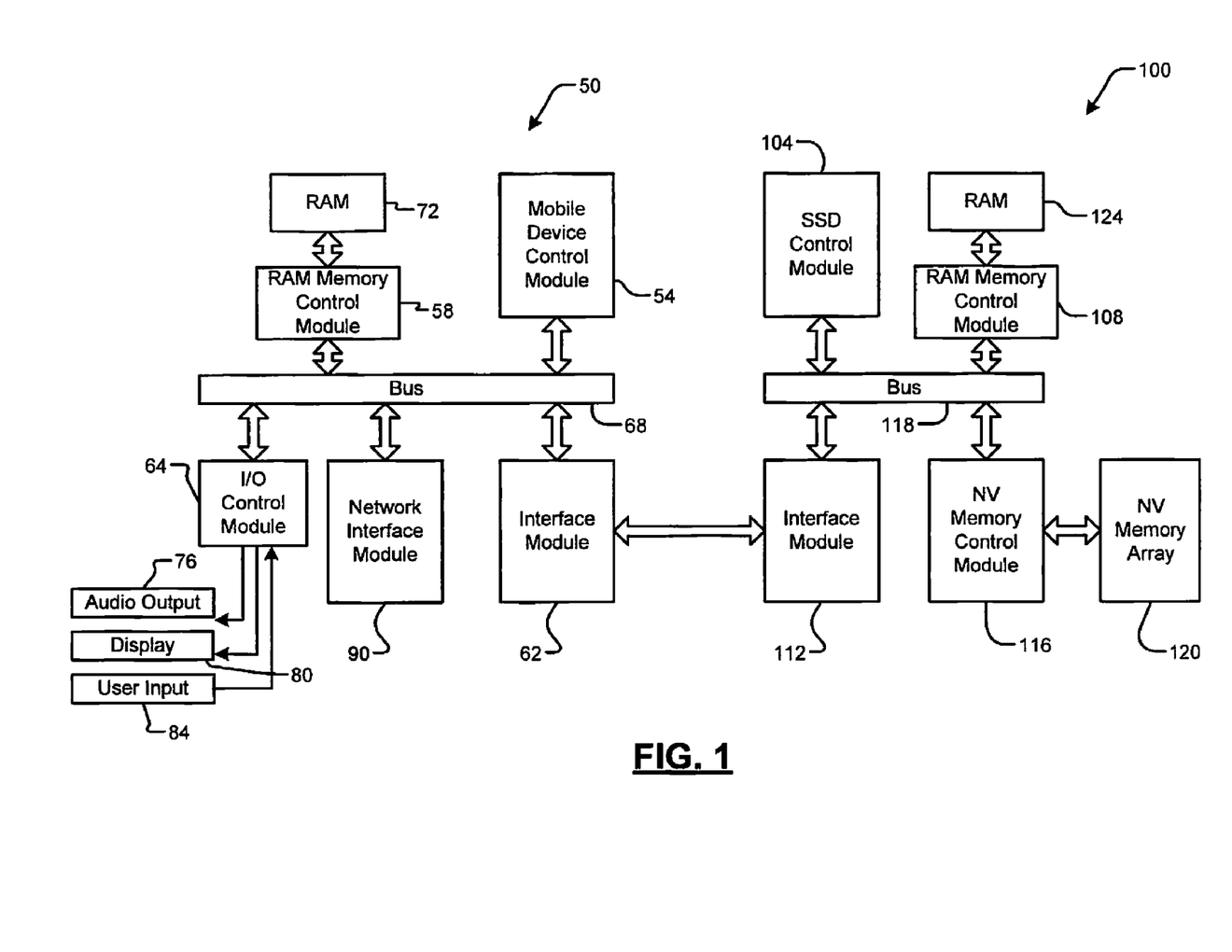
FIG. 1 is a first exemplary functional block diagram of a mobile device with a solid-state disk (SSD)

Referring now to FIG. 1, a mobile device 50 includes a mobile device control module 54, a RAM memory control module 58, a high-speed interface module 62, and an input/output (I/O) control module 64. These various modules may communicate directly or indirectly (e.g. via a bus 68). The RAM memory control module 58 controls reading and writing to RAM 72. For example only, the RAM 72 may include DRAM. The I/O control module 64 may communicate with an audio output 76, a display 80, and/or user inputs 84 such as a keypad, a touchpad, pointing device, etc. A network interface module 90 may be provided to allow communication with a wireless or wired network. For example only, the network interface module 90 may include cellular, Wireless local area network (WLAN), Bluetooth®, or other interfaces.

An SSD 100 includes an SSD control module 104, a RAM memory control module 108, a high-speed interface module 112 and a nonvolatile (NV) memory control module 116. These various modules may communicate directly and/or indirectly (e.g. via a bus 118). The NV memory control module 116 communicates with and controls a NV memory array 120. For example only, the NV memory array 120 may include flash memory such as but not limited to NAND flash memory. The RAM memory control module 108 controls reading from and writing to RAM 124. For example only, the RAM 124 may include DRAM.

In use, when the mobile device 50 needs to send data to and/or receive data from the SSD 100, the mobile device 50 sends/receives data via the high speed interface modules 62 and 112, which tend to consume high power. When the SSD 100 receives a request for data to be stored or data to be retrieved, the SSD 100 stores or retrieves the data from the NV memory array 120.

Figure 2:
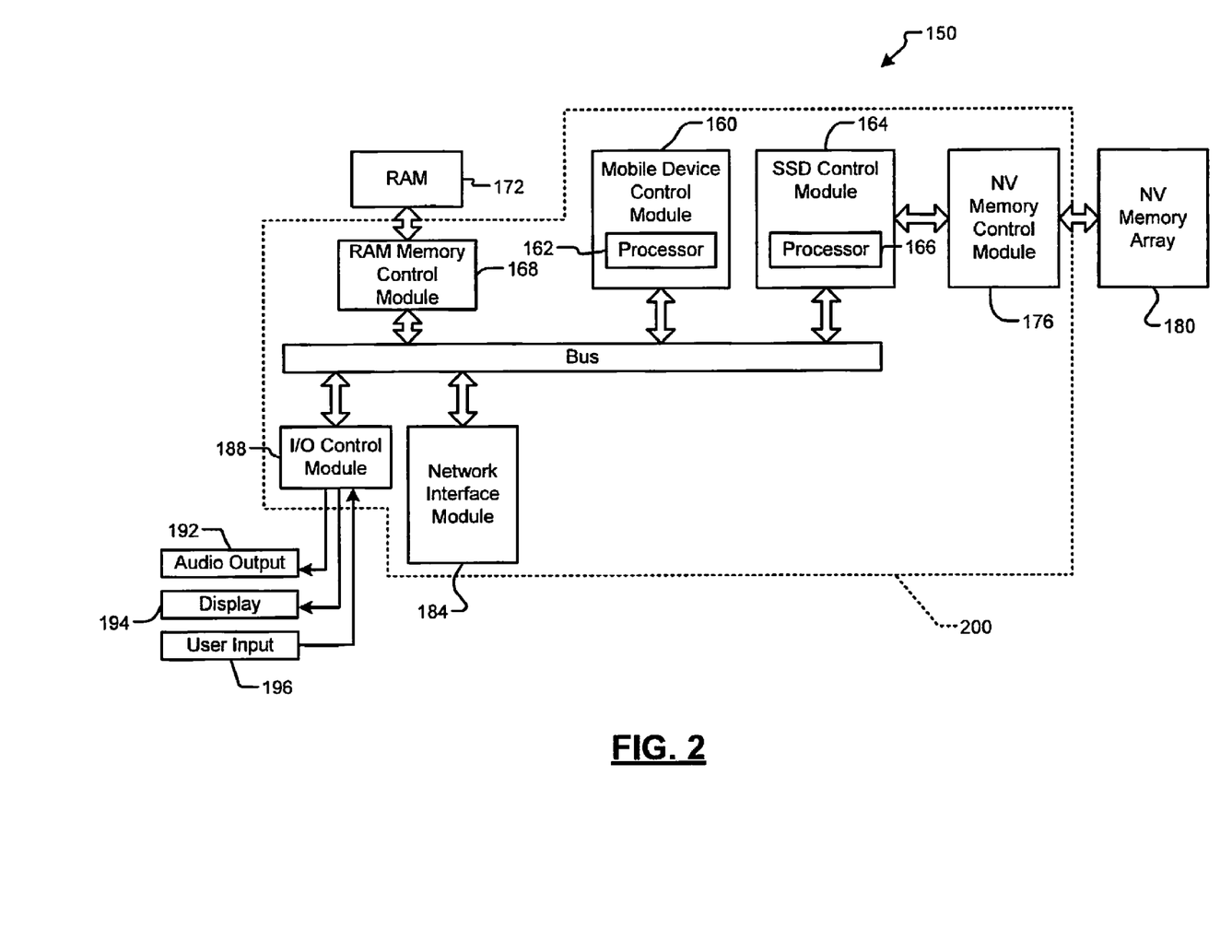
FIG. 2 is a second exemplary functional block diagram of a mobile device and an SSD according to the present disclosure.

Referring now to FIG. 2, a combined device 150 including a mobile device and an SSD with a shared memory architecture according to the present disclosure is shown. The combined device 150 includes a mobile device control module 160 comprising a mobile device processor 162 and a SSD control module 164 comprising an SSD processor 166. The mobile device processor 162 may execute host applications. The SSD processor 166 may execute read/write control, and/or storage related applications such as decoding, error correction, and/or other storage-related applications. The combined device 150 further includes a RAM memory control module 168 that controls access to RAM 172. For example only, the RAM 172 may include standard personal computer (PC) DRAM. The RAM 172 may be an integrated circuit (IC). The RAM memory control module 168 controls access to the RAM 172 for both the mobile device control module 160 and the SSD control module 164.

In this implementation, the RAM memory control module 168 may partition the RAM into at least two partitions—a mobile device partition for the mobile device control module 160 and an SSD partition for the SSD control module 164. In some implementations, the SSD partition may comprise less than or equal to 10% of the RAM 172. The partition percentage may be more or less depending on design and/or application considerations. More particularly, the RAM memory control module 168 stores and retrieves data from the SSD partition for SSD specific data. Only the SSD control module 164 is allowed to access the SSD partition; conversely, the SSD partition is protected against all other accesses, including without limitation, other components of the combined device 150 and virus software. Similarly, the RAM memory control module 168 stores and retrieves data from the mobile device partition for mobile device specific data. This approach ensures integrity of the SSD data.

The combined device 150 further includes a NV memory control module 176 that communicates with a NV memory array 180. For example only, the NV memory array 180 may include flash memory such as but not limited to NAND flash memory. The combined device 150 may further include a network interface module 184 and an I/O control module 188. The I/O control module 188 communicates with an audio output 192, a display 194, and user inputs 196. The mobile device control module 160, the SSD control module 164, the RAM memory control module 168, the nonvolatile memory control module 176, the network interface module 184, and the I/O control module 188 may communicate directly or indirectly (e.g. via a bus 198) or using any other suitable approach.

In some implementations, data in the RAM 172 is periodically stored in the NV memory array 180. More specifically, data in the SSD partition is saved periodically in the NV memory array 180. In addition, data in the mobile device partition may also be saved periodically to the NV memory array 180 in an idle mode, thereby allowing the RAM 172 to power down to prolong battery life. Alternatively, data in the RAM 172 may be stored into the NV memory array 180 before the combined device 150 is shut down or powered off. In some implementations, the data in the RAM 172 is compressed or otherwise encoded first before it is saved to the NV memory array 180. Such compression or encoding may further conserve power and/or prolong longevity of the NV memory array 180. Based on the disclosure provided herein, a person of ordinary skill in the art will understand how to select and utilize the appropriate compression or encoding algorithm(s) to implement the present disclosure.

Furthermore, during power-on or restart from an idle mode, data stored in the NV memory array 180, including the mobile device specific data, can be loaded quickly to the RAM 172. Since data in the RAM 172 is periodically stored in the NV memory array 180, wear-leveling techniques are used periodically or on a regular basis to prolong longevity of the NV memory array 180. Based on the disclosure provided herein, a person of ordinary skill in the art will understand how to select and utilize the appropriate wear-leveling technique(s) to implement the present disclosure.

Two or more of the mobile device control module 160, the SSD control module 164, the NV memory control module 176, the RAM memory control module 168, the I/O control module 188, and the network interface module 184 may be integrated as a system-on-chip (SOC) 200.

Figure 3:
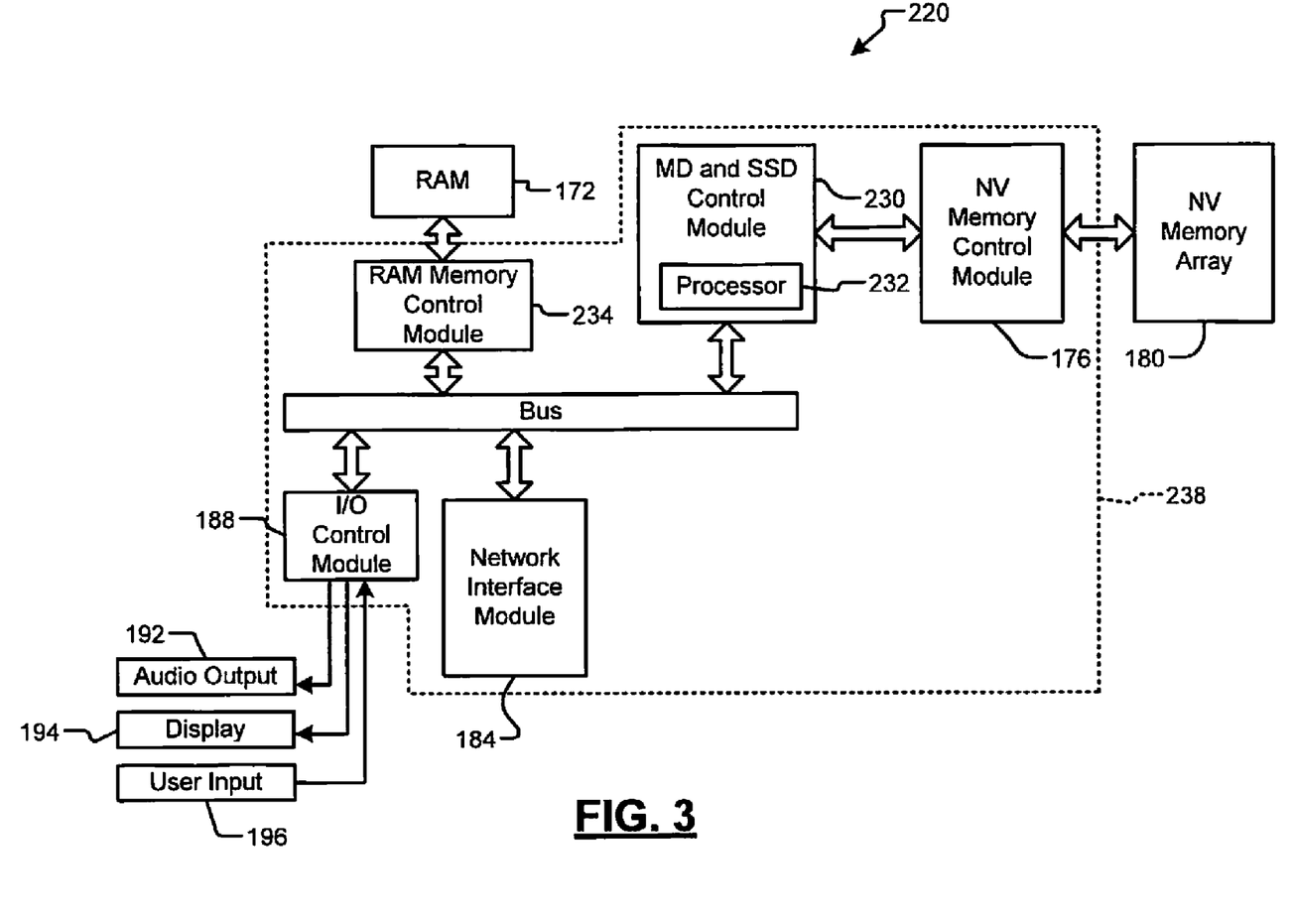
FIG. 3 is a third exemplary functional block diagram of a mobile device and an SSD according to the present disclosure.

Referring now to FIG. 3, another device 220 that includes a mobile device and an SSD with a shared memory architecture according to the present disclosure is shown. The device 220 includes a combined mobile device (MD) and SSD control module 230 comprising a shared processor 232. The device 220 includes a RAM memory control module 234. The shared processor 232 runs both SSD applications and host applications. Remaining components of the device 220 are similar to those shown in FIG. 2. In this implementation, the combined MD and SSD control module 230 may use data tags for read/write requests that are used to identify the SSD portion of the memory from the mobile device portion of the memory. In other words, the processor 232 may add an SSD tag to SSD RAM data and a mobile device tag to mobile device data.

Two or more of the combined mobile device and SSD control module 230, the NV memory control module 176, the RAM memory control module 234, the I/O control module 188, and the network interface module 184 may be integrated as a system-on-chip (SOC) 238.

Figure 4:
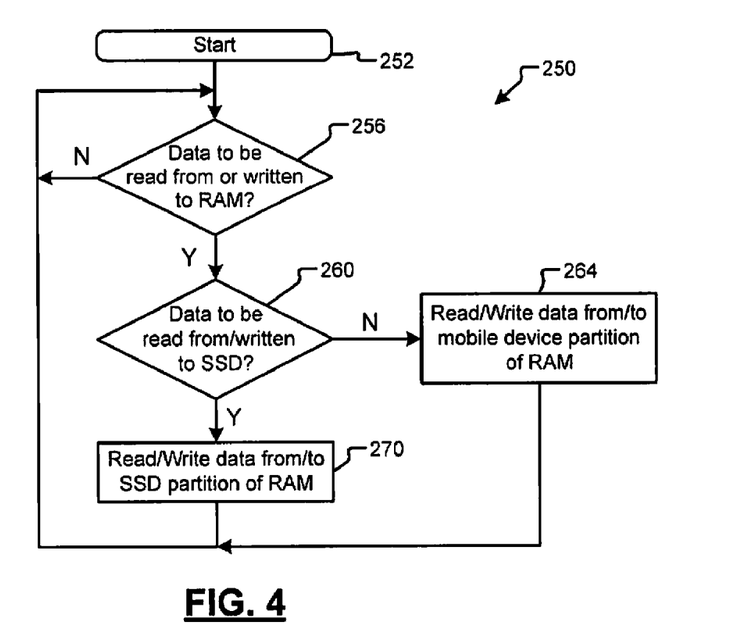
FIG. 4 is an exemplary method for using partitioning of random access memory (RAM) in a shared memory architecture.

Referring now to FIG. 4, steps of an exemplary method 250 performed by the mobile devices 150 and/or 220 are shown. Control begins with step 252. In step 256, the RAM memory control module 168 determines whether there is data to be read from or written to the RAM 172. If step 256 is false, control returns to step 256. If step 256 is true, the RAM memory control module 168 determines in step 260 whether the data to be read from or written to the RAM is associated with operation of the SSD. If step 260 is false, the RAM memory control module 168 reads/writes data from/to the mobile device partition of the RAM in step 264, and control returns to step 256. If step 260 is true, the RAM memory control module 168 reads/writes data from/to the SSD partition of the RAM 172 in step 270, and control returns to step 256.

Figure 5:
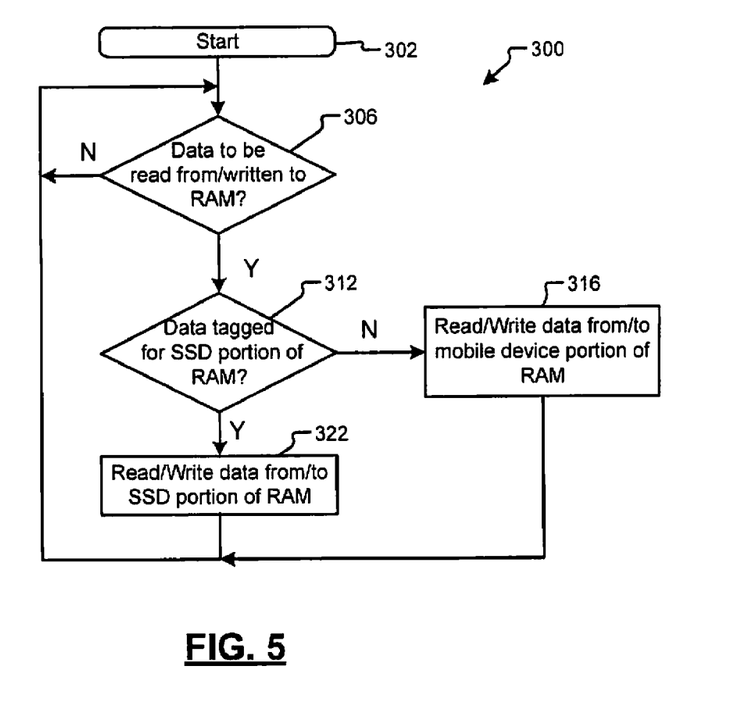
FIG. 5 is an exemplary method for using tagging of the RAM in a shared memory architecture.

Referring now to FIG. 5, steps of another exemplary method 300 performed by the mobile devices 150 and/or 220 are shown. Control begins with step 302. In step 306, the RAM memory control module 168 determines whether there is data to be read from or written to the RAM 172. If step 306 is false, control returns to step 306. If step 306 is true, the RAM memory control module 168 determines in step 312 whether the data to be read from or written to the RAM is tagged for the SSD. If step 312 is false, the RAM memory control module 168 reads/writes data from/to a mobile device portion of the RAM in step 316, and control returns to step 306. If step 312 is true, the RAM memory control module 168 reads/writes data from/to the SSD portion of the RAM 172 in step 322, and control returns to step 306.

Figure 6:
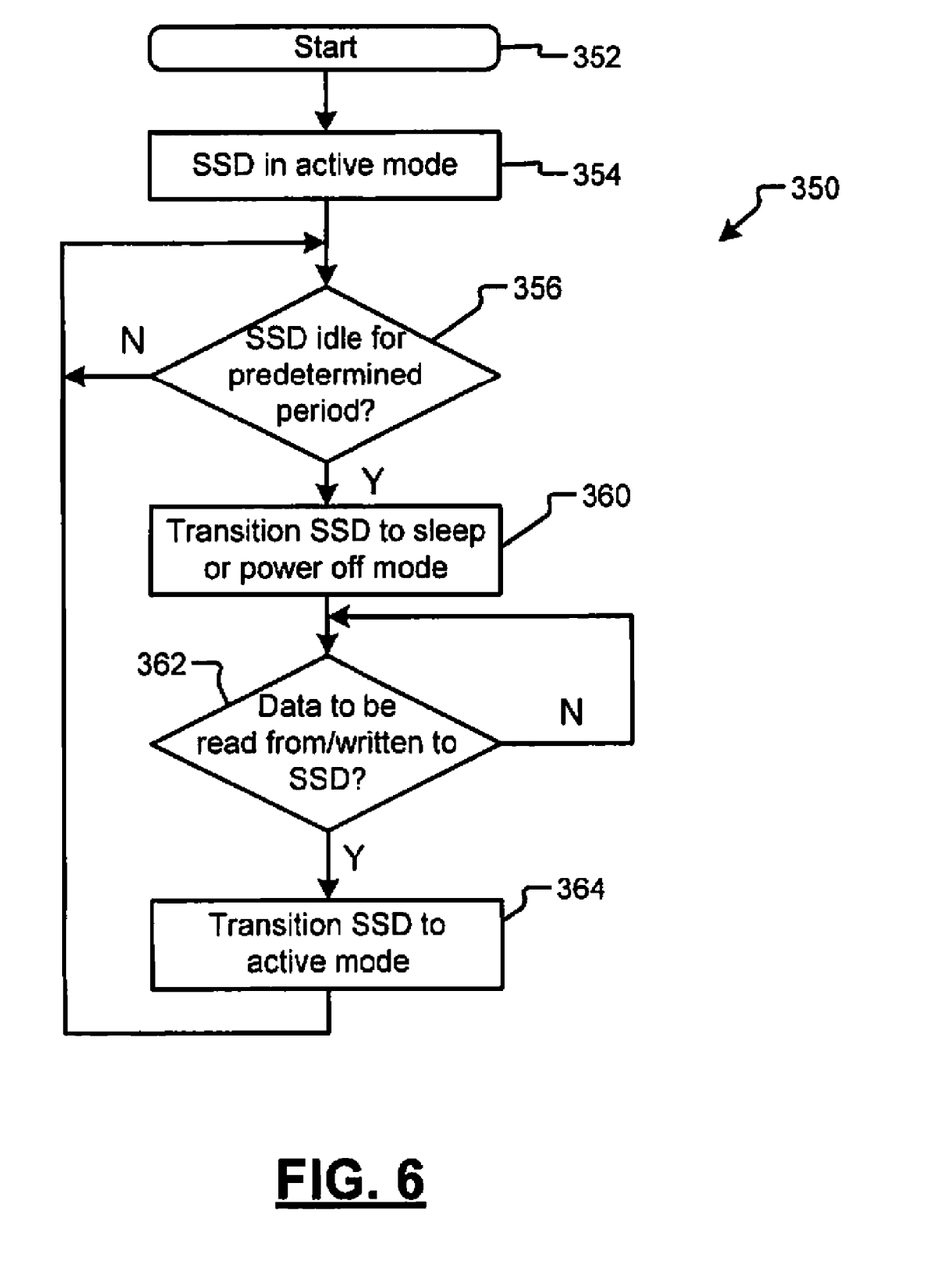
FIG. 6 is an exemplary method for transitioning SSD components between active and inactive modes.

Referring now to FIG. 6, an exemplary method 350 for controlling an operating mode of the SSD control module, NV memory control module, and/or NV memory array is shown. While the following discussion relates to the SSD control module, skilled artisans will appreciate that the NV memory control module and/or NV memory array may be operated in a similar manner. Control, which may be performed by the mobile device control module 160, begins in step 352. In step 354, the SSD control module 164 is initially turned on in an active or powered state. In step 356, control determines whether the SSD control module 164 has been idle for a predetermined period.

For example only, control may use an inactivity timer to time inactivity. Alternately, other criteria may be used in addition to or instead of the inactivity timer. For example only, the inactive mode may be event-based. For example only, the SSD control module 164 may be transitioned to the inactive mode when a battery state of the combined device is less than a predetermined level. Still other criteria may be used.

If step 356 is false, control returns to step 356. If step 356 is true, control transitions the SSD control module 164 to a sleep or power off mode in step 360. In step 362, control determines whether there is data to be written to/read from the SSD. If step 362 is false, control returns to step 362. If step 362 is true, control transitions the SSD control module 164 to the active mode. Skilled artisans will appreciate that the NV memory control module and NV memory array may likewise have inactive states and may be controlled in the same way.

During the inactive state, reduced power or no power may be supplied to the inactive components as compared to the active state. The reduced power level may be, in some circumstances, sufficient to maintain states of the devices and/or to reduce transients that may be encountered on startup.

The network interface used herein may be a wireless network interface that is compliant with one or more of Bluetooth® and/or IEEE standards 802.11, 802.11a, 802.11b, 802.11g, 802.11h, 802.11n, 802.16, and/or 802.20. The network interface may also comprise a cellular network interface such as code division/time division multiple access (CD/TDMA), Global System for Mobile Communication (GSM) Third Generation (3G), or other suitable cellular network interface.

As can be appreciated while specific devices are shown above, the architectures for these devices may be varied without departing from the scope of the present disclosure. For example only, some of the control modules may be combined with other control modules. The connections provided by the bus may be varied and/or direct connections may be used for one or more of the components. Still other variations are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A mobile device, comprising:
a system-on-chip (SOC) including
a mobile device control module configured to execute application programs for the mobile device;
a solid-state disk (SSD) control module configured to control SSD operations; and
a random access memory (RAM) control module configured to communicate with the mobile device control module and the SSD control module and to store both SSD-related data and mobile device-related data in a single RAM; and
a nonvolatile (NV) memory control module configured to communicate with the SSD control module and a NV memory array, and to control reading from and writing to the NV memory array,
wherein data in the single RAM is stored into the NV memory array during an idle mode,
wherein the single RAM is powered down during the idle mode after the data in the single RAM has been stored into the NV memory array, and
wherein the stored data in the NV memory array is loaded into the single RAM during a re-start mode.

2. The mobile device of claim 1, further comprising a processor configured to perform processing for both the mobile device control module and the SSD control module.

3. The mobile device of claim 1, wherein the mobile device control module comprises a mobile device processor configured to perform processing for the mobile device control module, and wherein the SSD control module comprises an SSD processor configured to perform processing for the SSD control module.

4. The mobile device of claim 1, wherein the NV memory control module is integrated with the SOC.

5. The mobile device of claim 1, further comprising the NV memory array.

6. A cellular phone, comprising:
the mobile device of claim 1; and
a cellular network interface module configured to communicate with the mobile device control module.

7. The mobile device of claim 1, wherein the mobile device control module is configured to selectively transition the SSD control module to an inactive state.

8. The mobile device of claim 1, further comprising:
the single RAM,
wherein the single RAM is a standard personal computer (PC) DRAM.

9. The mobile device of claim 1, wherein data in the single RAM is periodically stored into the NV memory array.

10. The mobile device of claim 9, wherein the data in the single RAM is compressed before it is stored into the NV memory array.

11. The mobile device of claim 9, wherein wear leveling is performed on the NV memory array on a periodic basis.

12. The mobile device of claim 1, wherein the NV memory array includes a flash memory.

* * * * *